March 11, 1969   M. W. HAGADORN ET AL   3,431,631
REFRACTORY METAL DIFFUSION BONDING
Filed Dec. 11, 1964   Sheet 1 of 2

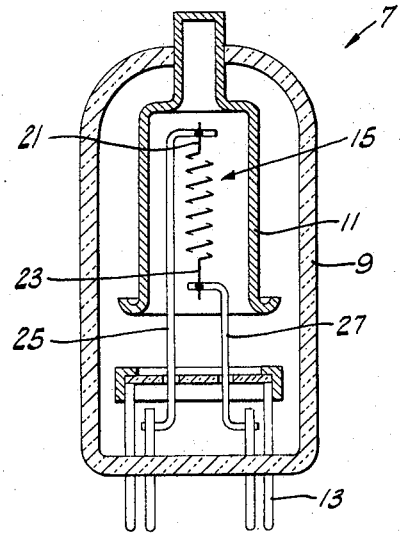

Fig. 1

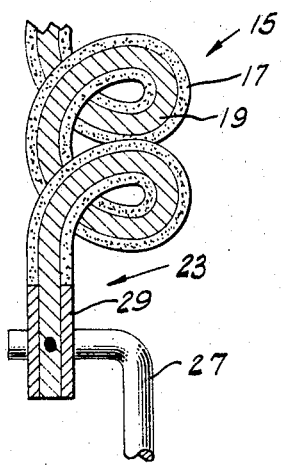

Fig. 2

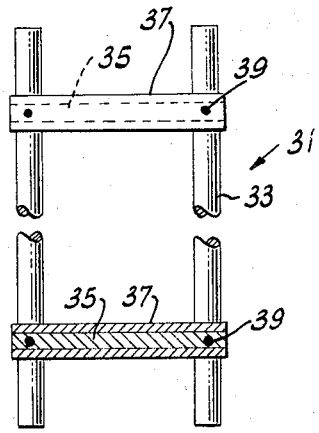

Fig. 3

| ATTACH METAL SHEATH TO REFRACTORY METAL |
| CONTACT SHEATH AND SECOND METAL |
| APPLY HEAT & PRESSURE TO SHEATH & METALS TO MELT SHEATH & INTER-DIFFUSE & BOND SHEATH METAL, REFRACTORY AND SECOND METAL |
| REMOVE HEAT & PRESSURE TO COOL & SOLIDIFY MELTED METAL |

Fig. 4

INVENTORS
M. WESTON HAGADORN &
DONALD R. KERSTETTER
BY
Robert E. Strausser
ATTORNEY

CONTACT REFRACTORY METAL AND A SECOND METAL

SURROUND AREA OF CONTACT BETWEEN SAID METALS WITH A LAYER OF A THIRD METAL

HEAT SAID METALS TO INTER-DIFFUSE SAID THIRD METAL INTO SAID REFRACTORY AND SECOND METALS AND FORM A DIFFUSION BOND

COOL SAID METALS

United States Patent Office 3,431,631
Patented Mar. 11, 1969

3,431,631
REFRACTORY METAL DIFFUSION BONDING
Marold Weston Hagadorn and Donald R. Kerstetter, Emporium, Pa., assignors to Sylvania Electric Products Inc., a corporation of Delaware
Filed Dec. 11, 1964, Ser. No. 417,574
U.S. Cl. 29—498       4 Claims
Int. Cl. B23k 31/02; H01j 9/00

ABSTRACT OF THE DISCLOSURE

A refractory metal diffusion bonding process includes the steps of attaching a sheath of iron metal to a refractory metal, contacting the sheath and a second metal, applying heat and pressure to melt the sheath and interdiffuse the iron into the refractory and second metal, and removing the heat and pressure to cause solidification of the iron.

---

This invention relates to metal bonding and more particularly to diffusion bonding refractory metals and diffusion bonding a refractory metal to a nonrefractory metal.

The bonding of refractory metals and of a refractory metal to a nonrefractory metal has long been a source of problems and frustrations in the manufacture of devices such as electron tubes which utilize relatively large amounts of such materials. Not only does the relatively high melting temperature of refractory metals provide a problem in attaching such metals but the tendency of such metals to recrystallize and become brittle below the melting temperature thereof provides even more difficulties when attempts are made to provide a dependable attachment thereof to other metals and especially other refractory metals.

As an example, the core materials in the filament of directly heated electron discharge devices and the heater in indirectly heated electron discharge devices is usually of a refractory metal such as tungsten. Also, this core material is frequently attached to a nonrefractory metal support member by the application of heat and pressure. Since the application of heat and pressure sufficient to meet and bond the refractory metal would destroy the support member, it has been a common practice to apply only enough heat and pressure to embed the refractory metal in the nonrefractory metal. As a result, the attachment is not a bonding technique but rather a compromise arrangement which merely "sticks" one metal to the other.

Further, even though the heat and pressure utilized in this compromise method of attachment is insufficient to melt the refractory metal, it has been found that the refractory metal does recrystallize and become embrittled in the area of applied heat and pressure as well as in the area immediately adjacent thereto. Moreover, these recrystallized and embrittled areas have long been known as the cause of catastrophic failures in electron tubes.

In attempting to overcome these shortcomings, one approach has been the deposition of a "shim" material such as nickel intermediate the refractory metal and the nonrefractory metal. Upon the application of heat and pressure, the two metals are, in effect, brazed together. However, it has been found that the "shim" material, such as the above-mentioned nickel, has a tendency to combine with the refractory metal to form brittle intermetallic compounds. Thus, the results obtainable with such techniques leave much to be desired.

Another example of the use of refractory metals in electron discharge devices is the fabrication of "strap-frame" type electrodes. In such electrodes, a wire helix of refractory metal is usually wrapped about a pair of spaced refractory metal side members. Then each turn of the helix is attached to the side members at the area of contact therebetween in order to prevent displacement of the turns. A common method for attaching the helix and side members is to surround the area of contact with a layer of thermosetting ceramic which affixes each helix turn to the side member. Although the ceramic serves to attach the helix and side members reasonably well, it has been found that the ceramic renders removal of the helix from the side members most difficult, if not impossible, without damage to the side members. Thus, the use of a ceramic prevents the salvage of usable parts from electrodes. Further, the utilization of a ceramic material for affixing the metals leaves much to be desired because of the relatively poor electrical conductivity of the ceramic as compared with the relatively good electrical conductivity obtainable with a metal.

In each of the above examples, as well as numerous others, a satisfactory solution of the problems of attaching a refractory metal to another refractory metal and to a nonrefractory metal has not been previously provided. Moreover, this problem is especially evident to the manufacturer of electron discharge devices.

Therefore, it is an object of this invention to enhance the bonding of refractory metals as well as the bonding of a refractory metal and a nonrefractory metal.

Another object of the invention is to provide an improved process for bonding refractory metals and a refractory metal to a nonrefractory metal.

Still another object of the invention is to provide an improved diffusion bond of refractory metals and a refractory metal to a nonrefractory metal.

A further object of the invention is to enhance the bonding of a refractory metal core and a nonrefractory metal suport in an electron discharge device.

A still further object of this invention is to provide an improved process for diffusion bonding refractory metals of an electrode for an electron discharge device.

These and other objects are achieved in one aspect of the invention by attaching a metal sheath to a refractory metal, contacting the sheath and second metal, applying pressure and heat to the sheath and metals sufficient to melt the sheath and interdiffuse the metal thereof into the refractory metal and the second metal to form a diffusion bond, and removing the pressure and heat to permit the solidification of the sheath metal.

Alternately, a refractory metal is placed in contact with a second metal; a layer of a third metal is affixed to and surrounds the area of contact between the refractory and second metal; heat is applied to the metals in an amount sufficient to sinter the third metal and cause interdiffusion thereof into the refractory and second metals and the formation of a diffusion bond therebetween; and the heat is removed to cause the metals to cool.

For a better understanding of the present invention, together with other and further objects, advantages, and capabilities thereof, reference is made to the following disclosure and appended claims in conjunction with the accompanying drawings in which:

FIG. 1 is an illustration of a directly heated electron discharge device having a refractory metal core diffusion bonded to a nonrefractory metal support;

FIG. 2 is an enlarged view of the bonded core and support of FIG. 1;

FIG. 3 is an illustration of the bonding of refractory metal cross members to refractory metal side members in a frame suitable for use in the fabrication of a "strap-frame" type electrode;

FIG. 4 is a flow chart illustrating a process for bonding a refractory metal and a second metal;

Figures 5, 6:
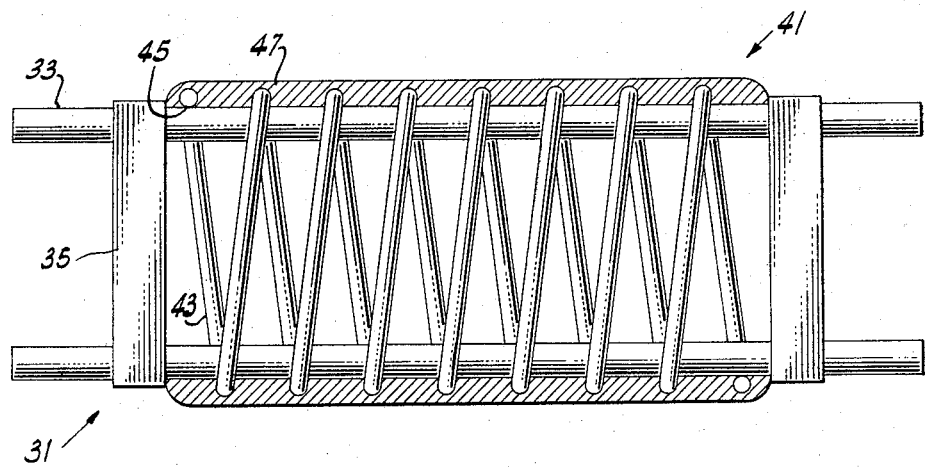
FIG. 5 illustrates a "strap-frame" type electrode wherein a refractory metal helix is bonded to a refractory metal side member.
FIG. 6 is a flow chart illustrating a bonding process applicable to the electrode of FIG. 5.

Referring to the drawings, FIG. 1 illustrates a typical directly heated electron discharge device 7, including an hermetically sealed envelope 9, an anode electrode 11 attached to and extending through one end of the envelope 9, and a plurality of electrical conductors 13 sealed into and extending through the opposite end of the envelope 7. Disposed within the anode electrode 11 is a directly heated filament 15 having a layer 17 of potentially emissive materials, such as a mixture of the well-known alkaline earth carbonates, surrounding and adhered to the major portion of a metal core 19. Also, the filament 15 has end portions 21 and 23, respectively, attached to connectors 25 and 27 which are affixed to separate ones of the conductors 13. In this manner, the filament 15 is supported and positioned within the discharge device 7.

Referring to the exploded view of FIG. 2, the filament 15 has a layer 17 of potentially emissive materials surrounding a major portion of the core 19. The core 19 usually and preferably is a refractory metal selected from the group of which tungsten, molybdenum, columbium, platinum, and ruthenium, as well as alloys thereof, are suitable examples. Also, the connectors 25 and 27 are usually of a material such as nickel, steel, and alloys thereof although numerous other metals are equally applicable and appropriate so long as they are adapted for attachment of other metals thereto and are not deleterious to the operation of a discharge device.

Affixed to and surrounding the end portions 21 and 23, respectively, is a metal sheath 29. The sheath 29 is of a metal characterized by the ability thereof to "wet" other metals, melt at a temperature lower than the melting temperature of refractory metals, resist the formation of brittle intermetallic compounds upon contact with the refractory metals when pressure and heat are applied thereto, and have a slight solubility in refractory metals. Examples of materials applicable for the metal sheath 29 are metals selected from the group consisting of iron, platinum, ruthenium, rhodium, palladium, osmium, and iridium, as well as platinum-copper and silver-copper alloys.

In another application, FIG. 3 illustrates a frame 31 suitable for use in the fabrication of a "strap-frame" electrode for an electron discharge device. The frame 31 includes spaced side members 33 and spaced cross members 35. The side members 33 and cross members 35 are preferably of a refractory material such as molybdenum in order to provide sufficient strength to the frame 31, and a layer 37 of a metal selected from the above-enumerated group of metals applicable for the metal sheath 29 of FIG. 2 surrounds and is adhered to the cross members 35. The cross members 35 bridge and are diffusion bonded to the side members 33 at a jointure 39 by means of the layer 37.

As to a process for bonding a refractory metal to a second metal, reference is made to the flow chart illustrated in FIG. 4. The refractory metal is surrounded by an adherent sheath of metal selected from the previously enumerated group of sheath metal materials having the desired and necessary characteristics. Obviously, any one of a number of well-known techniques for applying a metal sheath to a refractory metal is equally applicable and appropriate. For example, the refractory metal may be dip coated in a slurry of metal particles suspended in a volatile organic binder and fired to remove the binder and sinter the metal particles to each other and to the metal.

Obviously, the metal particles must be sinterable and the firing atmosphere should be reducing in order to prevent the formation of undesired oxides which would have a deleterious effect on the sintering process. Further, the binder should be organic and any of the ordinary binder materials are applicable so long as the volatilization temperature thereof is lower than the sintering temperature of the metal particles and no undesired residue remains after volatilization thereof. Thus, a tenacious and stable metal sheath is provided which is neither harmful to the operation of such critical devices as electron tubes nor attacks the metals in contact therewith.

The metal sheath surrounding the refractory metal is placed in contact with a second metal which may be either another refractory metal or a nonrefractory metal suitable for attachment of other metals thereto. Heat and pressure are applied to the sheath and the metals in a quantity and at a rate sufficient to cause the sheath to melt and the metal thereof to interdiffuse into and diffusion bond both the refractory metal and the second metal. Thereafter, the heat and pressure are removed and the melted sheath metal cools and solidifies.

As a specific example of the process, the exposed leg portions of a tungsten heater for an electron discharge device were dip coated with a slurry which included the following ingredients and proportions:

Carbonyl iron (Grade E) _____ gms__ 100
Lacquer—R. and S. _____ cc__ 40
Pentacetate _____ cc__ 20

The laquer is a standard volatile organic binder product available from Raffi and Swanson Co. located at Chelsa, Mass., and the pentacetate is available from the Sharples Corporation and is a solvent which, as far as is known, appears to be a mixture of:

N-amyl acetate
2-methyl butyl acetate
3-methyl butyl acetate
4-methyl butyl acetate
3-ethyl propyl acetate The heater having slurry-coated leg portions was fired in a reducing atmosphere for approximately 10 minutes at a temperature of about 800° C. During this firing the organic binder was volatilized and the iron metal particles sintered to each other and to the tungsten leg portions and provided an iron metal sheath thereon.

Following, each leg portion was placed in contact with a nickel-plated steel electrical connector as is commonly used to provide electrical connections in electron tubes. Each leg portion and contacting connector was then placed intermediate a pair of electrodes in an ordinary resistance welding apparatus, and heat and pressure were applied thereto in an amount and at a rate such that the iron metal melted and diffused into the tungsten and the nickel-plated steel connector to form a diffusion bond therebetween.

Upon removal of the heat and pressure, the melted iron solidified and there was provided a diffusion bond between the tungsten and the iron and the iron and the nickel-plated steel. Also, the iron was welded to the nickel-plated steel. Moreover, it was found that the quantity of heat and pressure required to bond the metals was much less than the heat and pressure ordinarily required to affix a tungsten to nickel-plated steel. Also, microscopic examination revealed that the bond was of a diffusion type, and the tungsten wire showed no evidence of recrystallization or embrittlement.

In another example, a molybdenum cross member was bonded to a molybdenum side member of a strap-frame grid electrode in a manner similar to the above-described process. The cross member was dip coated with the above-listed slurry, fired to volatilize the binder and sinter the metal particles, placed in contact with the molybdenum side member, and sufficient heat and pressure applied to the cross member and side member to cause the iron to melt and diffuse into the refractory metals to form a diffusion bond therebetween. Upon removal of the heat and pressure, the iron solidified and the refractory metal cross member was bonded to the refractory metal side member.

In an alternate technique, FIG. 5 illustrates a "strap-frame" type electrode 41 suitable for use in an electron discharge device. The electrode 41 utilizes the strap frame 31 of FIG. 3 which includes the side member 33 and the cross member 35 bridging and bonded thereto. Also, a wire helix 43 is wrapped about the side member 33. The side members 33 and the helix 43 have an area of contact 45 therebetween and either or both are of a metal selected from the above-mentioned examples of refractory metals.

Surrounding the area of contact 45 and diffusion bonding the helix 43 to the side member 33 is a layer 47 of a third metal. This third metal has all of the previously mentioned characteristics applicable to the material for the metal sheath 29 of FIG. 2, such as the ability to "wet" other metals, resist the formation of brittle intermetallic compounds upon contact with refractory metals and the application of heat thereto, and have a slight solubility in refractory metals.

Additionally, metals which form a solid solution in another metal and are sinterable at a temperature of not more than about 900° C. are applicable to the fabrication of electrodes 41 of the strap-frame type. Since electrodes 41 of the strap-frame type are usually fabricated with a helix 43 having a wire with a diameter in the range of about 0.0001 to 0.001 inch, it has been found that temperatures greater than 900° C. tend to distort the helix 43, and such distortion deleteriously affects the critical spacing obtainable with such an electrode 41. Thus, any of the materials applicable to the metal sheath 29 of FIG. 2 are equally appropriate as the third metal in a strap-frame electrode 41 so long as the sintering temperature of the third metal is not greater than about 900° C. Further, alloys which include aluminum and nickel in a solid state solution are also applicable because of the inability of the aluminum and nickel to form brittle intermetallic compounds with a refractory metal while in solution form.

As to a process for fabricating an electrode 41 of the "strap-frame" type, reference is made to the flow diagram of FIG. 6. The frame 31 of FIG. 3, having refractory metal side members 33, is wrapped with a wire helix 43 which is also preferably a refractory metal. Thus, an area of contact 45 therebetween is provided, and this area of contact 45 is surrounded by a layer of a third metal. Then the electrode with the layer of the third metal thereon is heated in a reducing atmosphere to a temperature not greater than about 900° C. whereupon the third metal interdiffuses with the refractory metals to produce a refractory metal bond. Thereafter, the electrode is removed from the heat and allowed to cool.

As a specific example, a frame having molbydenum metal side members was wrapped with a wire helix of tungsten wire. A slurry of iron metal particles suspended in a binder such as previously described was painted on and surrounded the area of contact between the side members and the wire helix. The electrode was then heated to a temperature of about 800° C. for 10 minutes in a dissociated ammonia atmosphere whereupon the organic materials were volatilized and the iron metal particles sintered and diffused into the wire helix as well as the side members to form a diffusion bond therebetween. Upon removing the heat, the metals cooled for subsequent use of the electrode.

Thus, there has been provided a diffusion bond as well as a unique process for diffusion bonding refractory metals and a refractory metal to a nonrefractoy metal which have numerous advantages over prior known refractory metal attachments and techniques for attachment. For instance, the operational latitude of applied heat and pressure has been greatly increased and the reliability and repeatability of the bond correspondingly enhanced. Further, the metal attachment is a diffusion bond rather than merely an affixing of one metal to another, and this diffusion bond is provided without embrittlement or recrystallization of the materials which are bonded.

Additionally, an electrode of the "strap-frame" type has been provided wherein a refractory metal wire helix and side member are diffusion bonded. Moreover, this diffusion bond is provided by a process which neither embrittles nor recrystallizes nor causes a distortion or relaxation of the refractory metals. Thus, the critical spacing advantages of such an electrode are further enhanced by the improved attachment between the helix and the side members. Further, the improved electrical conductivity between the refractory metals, as well as the relative ease with which the bond can be removed to permit salvage of usable parts, are believed to be advantages unobtainable by any other known technique.

While there have been shown and described what are at present considered the preferred embodiments of the invention, it will be obvious to those skilled in the art that various changes and modifications may be made therein without departing from the scope of the invention as defined by the appended claims.

What is claimed is:

1. A process for diffusion bonding a refractory metal and a second metal comprising the steps of:
   attaching an iron metal sheath to a refractory metal;
   contacting the iron metal sheath and a second metal;
   applying heat and pressure to the sheath and the metals in an amount sufficient to melt the sheath and cause the interdiffusion of the iron into the refractory metal and the second metal and the formation of a diffusion bond therebetween; and
   removing the heat and pressure to cause the cooling and solidification of the iron.

2. The bonding process of claim 1 wherein said heat is applied in a reducing atmosphere at a temperature not greater than about 900° C.

3. A process for diffusion bonding refractory metals comprising the steps of:
   attaching an iron metal sheath to a refractory metal;
   contacting the iron metal sheath and a second refractory metal;
   applying heat and pressure to the iron metal sheath and the refractory metals in an amount sufficient to melt the iron metal sheath and interdiffuse the iron into the refractory metals and form a diffusion bond; and
   removing the heat and pressure to cause the cooling and solidification of the iron metal.

4. A process for bonding a tungsten metal core to a metal support for use in the fabrication of electron discharge devices comprising the steps of:
   affixing a sheath of iron metal to a portion of the tungsten core;
   contacting said sheath-covered portion of said core and said support;
   applying heat and pressure to said sheath-covered portion of said core and said support in an amount sufficient to melt said sheath and interdiffuse the iron metal of said sheath into said tungsten core and said support and form a diffusion bond; and removing said heat and pressure to cause the cooling and solidification of said metals.

References Cited

UNITED STATES PATENTS

| | | | |
|---|---|---|---|
| 2,698,913 | 1/1955 | Espersen | 29—198 X |
| 2,844,868 | 7/1958 | Cline et al. | 29—504 X |
| 2,945,295 | 7/1960 | Feaster | 29—504 X |
| 3,212,169 | 10/1965 | Glaser et al. | 29—504 X |
| 3,311,964 | 4/1967 | Hendricks et al. | 29—504 X |

FOREIGN PATENTS 487,263  6/1938  Great Britain.

WILLIAM I. BROOKS, *Primary Examiner.*

U.S. Cl. X.R.

29—25.14, 494, 504